United States Patent
Bhiravabhatla et al.

(10) Patent No.: US 10,546,362 B2
(45) Date of Patent: *Jan. 28, 2020

(54) METHOD AND APPARATUS FOR ADAPTIVE PIXEL HASHING FOR GRAPHICS PROCESSORS

(71) Applicant: Intel Corporation, Santa Clara, CA (US)

(72) Inventors: Kalyan K. Bhiravabhatla, Bangalore (IN); Subramaniam Maiyuran, Gold River, CA (US); Jorge F. Garcia Pabon, Folsom, CA (US); Saurabh Sharma, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/830,860

(22) Filed: Dec. 4, 2017

(65) Prior Publication Data

US 2018/0218474 A1    Aug. 2, 2018

Related U.S. Application Data

(63) Continuation of application No. 14/866,437, filed on Sep. 25, 2015, now Pat. No. 9,836,809.

(51) Int. Cl.
*G06T 1/20* (2006.01)
*G06F 16/22* (2019.01)
*G06T 1/60* (2006.01)

(52) U.S. Cl.
CPC ............ *G06T 1/20* (2013.01); *G06F 16/2255* (2019.01); *G06T 1/60* (2013.01)

(58) Field of Classification Search
None
See application file for complete search history.

(56) References Cited

U.S. PATENT DOCUMENTS

| 5,276,532 A * | 1/1994 | Harrington .............. G09G 5/02 345/545 |
| 7,058,639 B1 | 6/2006 | Chatterjee et al. |

(Continued)

OTHER PUBLICATIONS

International Search Report and Written opinion for PCT Application No. PCT/US2016/048927 dated Dec. 5, 2016, 12 pages.

(Continued)

*Primary Examiner* — Vu Nguyen
(74) *Attorney, Agent, or Firm* — Nicholson De Vos Webster & Elliott LLP

(57) ABSTRACT

An apparatus and method for adaptive pixel hashing. For example, one embodiment of a method comprises: determining X and Y coordinates for a pixel block to be processed; performing a first lookup in a first data structure to identify a second data structure; performing a second lookup in the second data structure using the X and Y coordinates for the pixel block to identify a third data structure; performing a third lookup in a third data structure indexed based on the X and Y coordinates of the pixel block, the third lookup identifying an entry in the third data structure corresponding to the X and Y coordinates of the pixel block; reading information from the entry identifying an execution cluster to process the pixel block; and processing the pixel block by the execution cluster.

20 Claims, 18 Drawing Sheets

(56) References Cited

U.S. PATENT DOCUMENTS

| | | |
|---|---|---|
| 9,026,615 B1 | 5/2015 | Sirton et al. |
| 2008/0117221 A1 | 5/2008 | Hutchins et al. |
| 2015/0206276 A1 | 7/2015 | Jung et al. |
| 2015/0254818 A1 | 9/2015 | Li et al. |

OTHER PUBLICATIONS

Non-Final Office Action from U.S. Appl. No. 14/866,437, dated May 12, 2017, 10 pages.
Notice of Allowance from U.S. Appl. No. 14/866,437, dated Aug. 18, 2017, 9 pages.
Abandonment from U.S. Appl. No. 15/830,836, dated Aug. 28, 2018, 2 pages.
International Preliminary Report on Patentability for Application No. PCT/US2016/048927, dated Apr. 5, 2018, 9 pages.

* cited by examiner

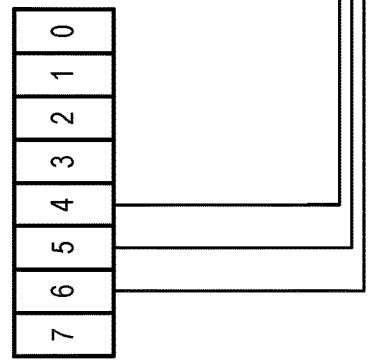
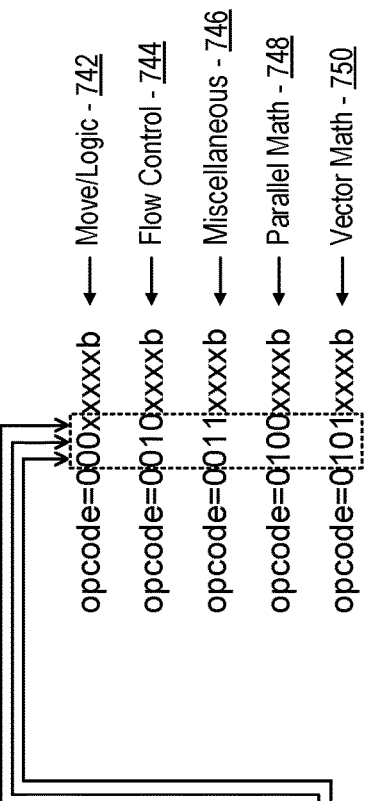
FIG. 7

FIG. 9A  GRAPHICS PROCESSOR COMMAND FORMAT
900
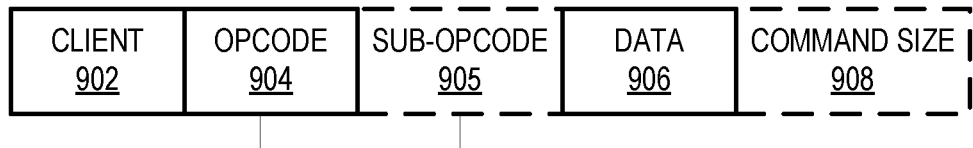
FIG. 9B  GRAPHICS PROCESSOR COMMAND SEQUENCE
910
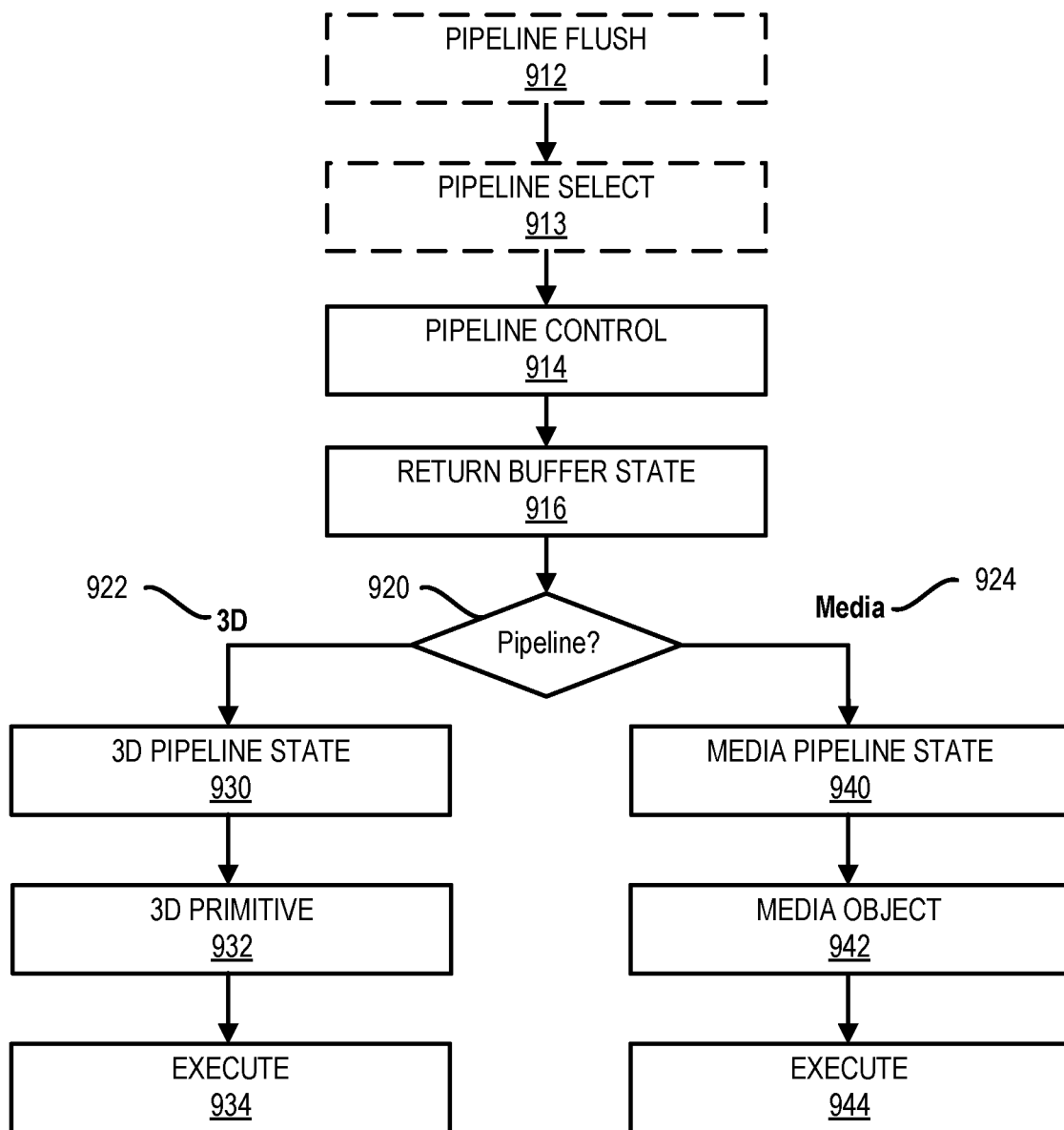

METHOD AND APPARATUS FOR ADAPTIVE PIXEL HASHING FOR GRAPHICS PROCESSORS

CROSS-REFERENCE TO RELATED APPLICATIONS

The present patent application is a continuation application claiming priority from U.S. patent application Ser. No. 14/866,437, filed Sep. 25, 2015, and titled: "Method and Apparatus for Adaptive Pixel Hashing for Graphics Processors", which is incorporated herein by reference in its entirety.

BACKGROUND

Field of the Invention

This invention relates generally to the field of computer processors. More particularly, the invention relates to an apparatus and method for adaptive pixel hashing in a processor such as a graphics processor.

Description of the Related Art

Today's Graphics-Processing-Unit (GPU) is a combination of multithreaded parallel processors that do extremely well not only on graphics but also on computing applications. Theoretically, the GPU performance is a product of two factors: the number of floating-point units (FPUs) and the inherent parallelism present in the application. Major advancements in semiconductor process technology (e.g., the continued miniaturization of CMOS devices) has produced faster and smaller transistors, enabling a massive number of FPUs in a single GPU. Further, this large number of FPUs has provided the software programmer with a substrate to rapidly solve complex problems that have considerable parallelism. These trends have significantly increased GPU performance, enabling leaps in software functionality and making it a ubiquitous commodity.

Unfortunately, there are various factors that can contribute to less than optimal performance of parallel machines like GPUs. One such factor is load Imbalance, i.e., not all of the compute nodes are busy doing the useful work and some are idle. Another factor relates to inefficiencies due to improper use of data locality—i.e., either compute nodes or compute clusters cannot contain much of the data needed by executing tasks, resulting in communication overhead, latency increases, and therefore longer execution times. Both of the above issues result from the fact that tasks are scheduled inefficiently on current implementations. Consequently, there is a significant decrease in the performance on current systems due to contention.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
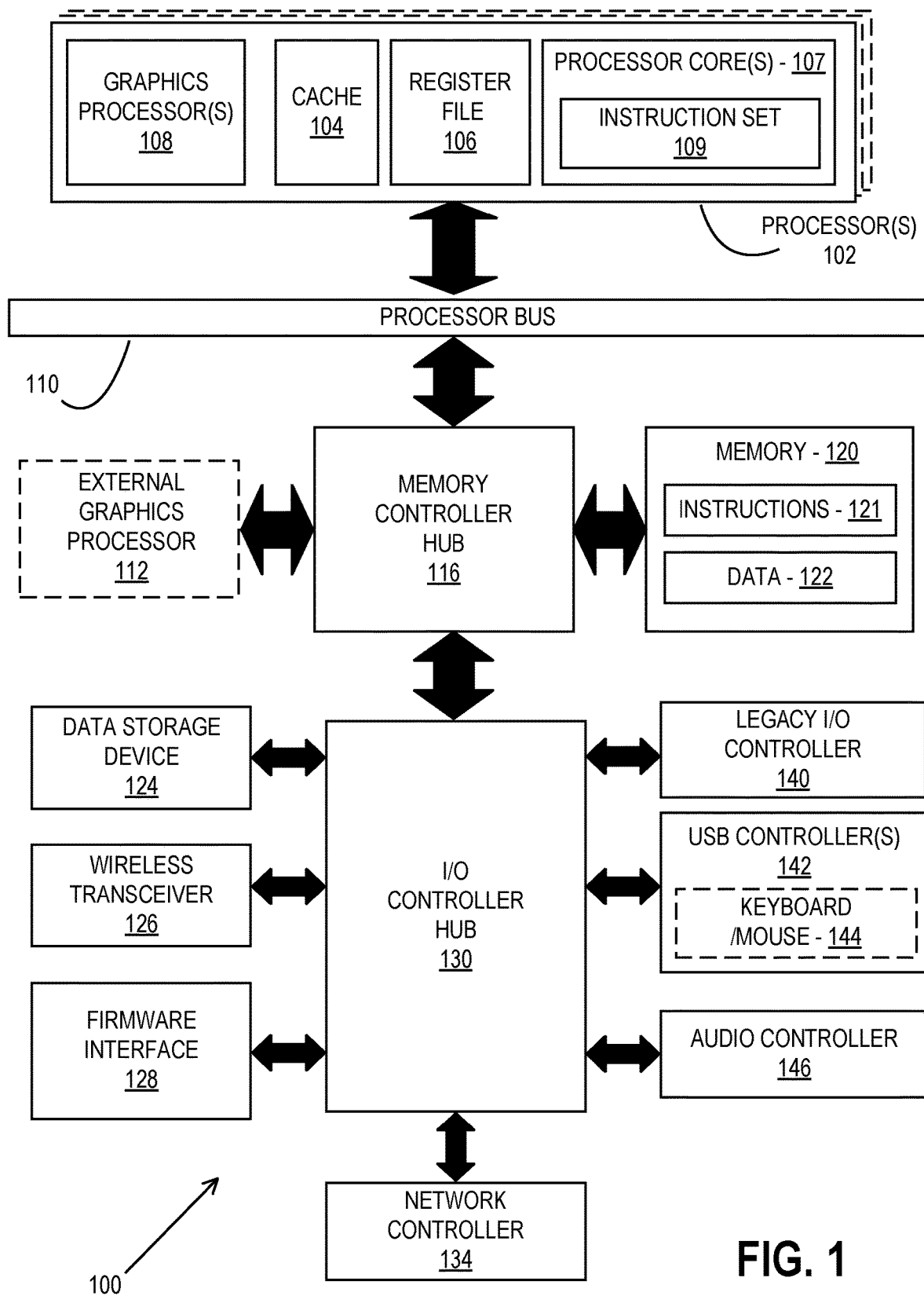
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
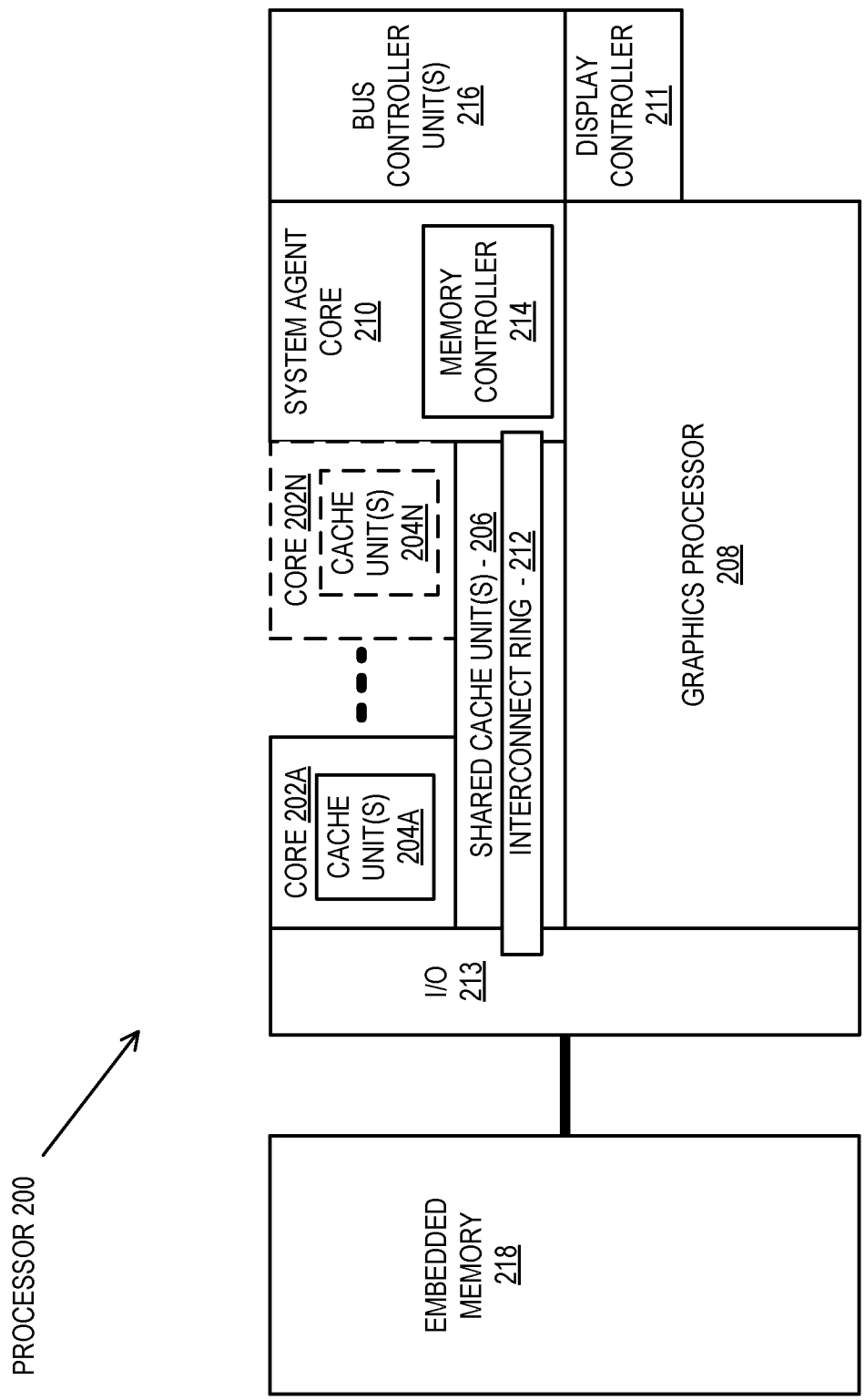
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
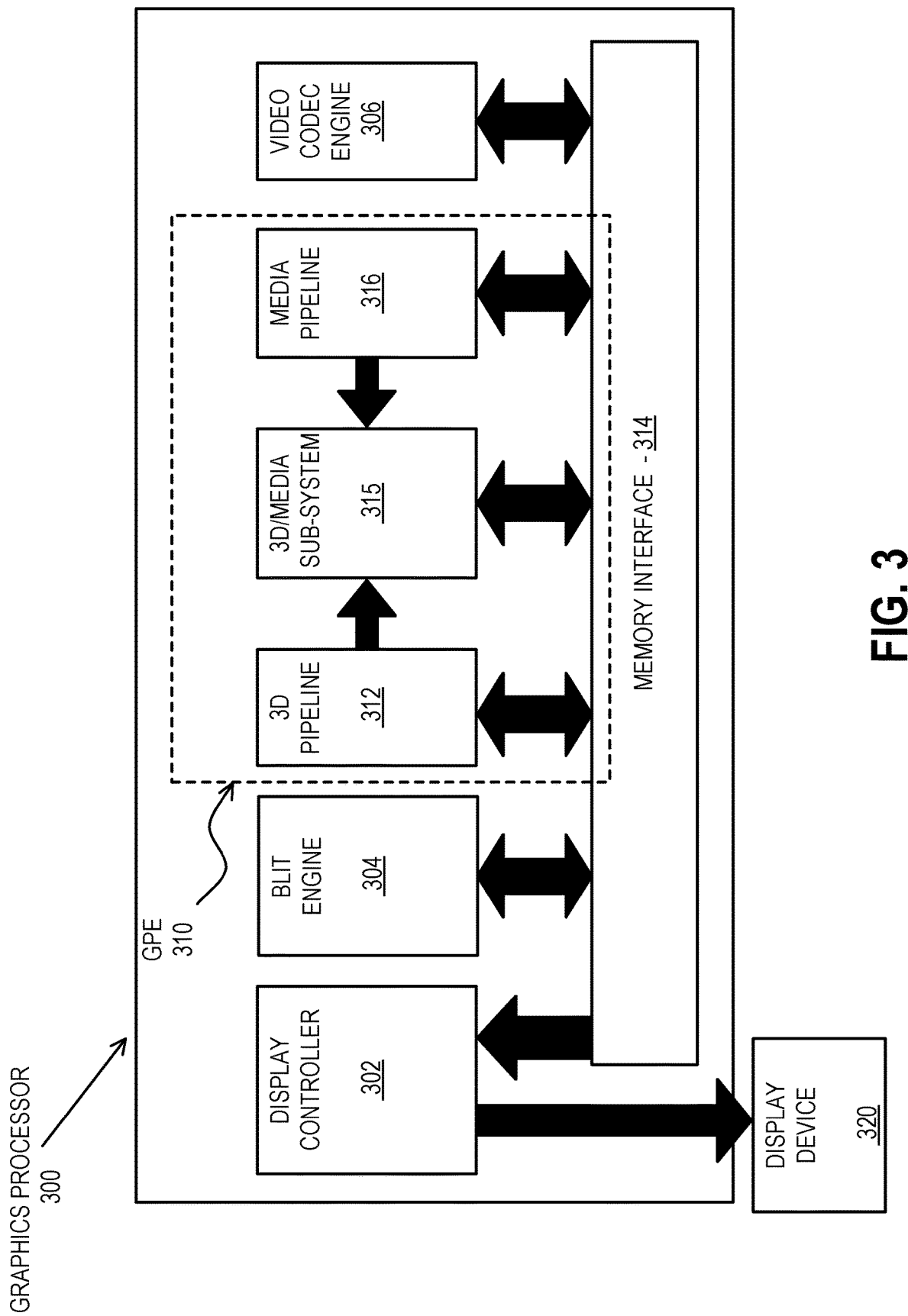
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/ MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
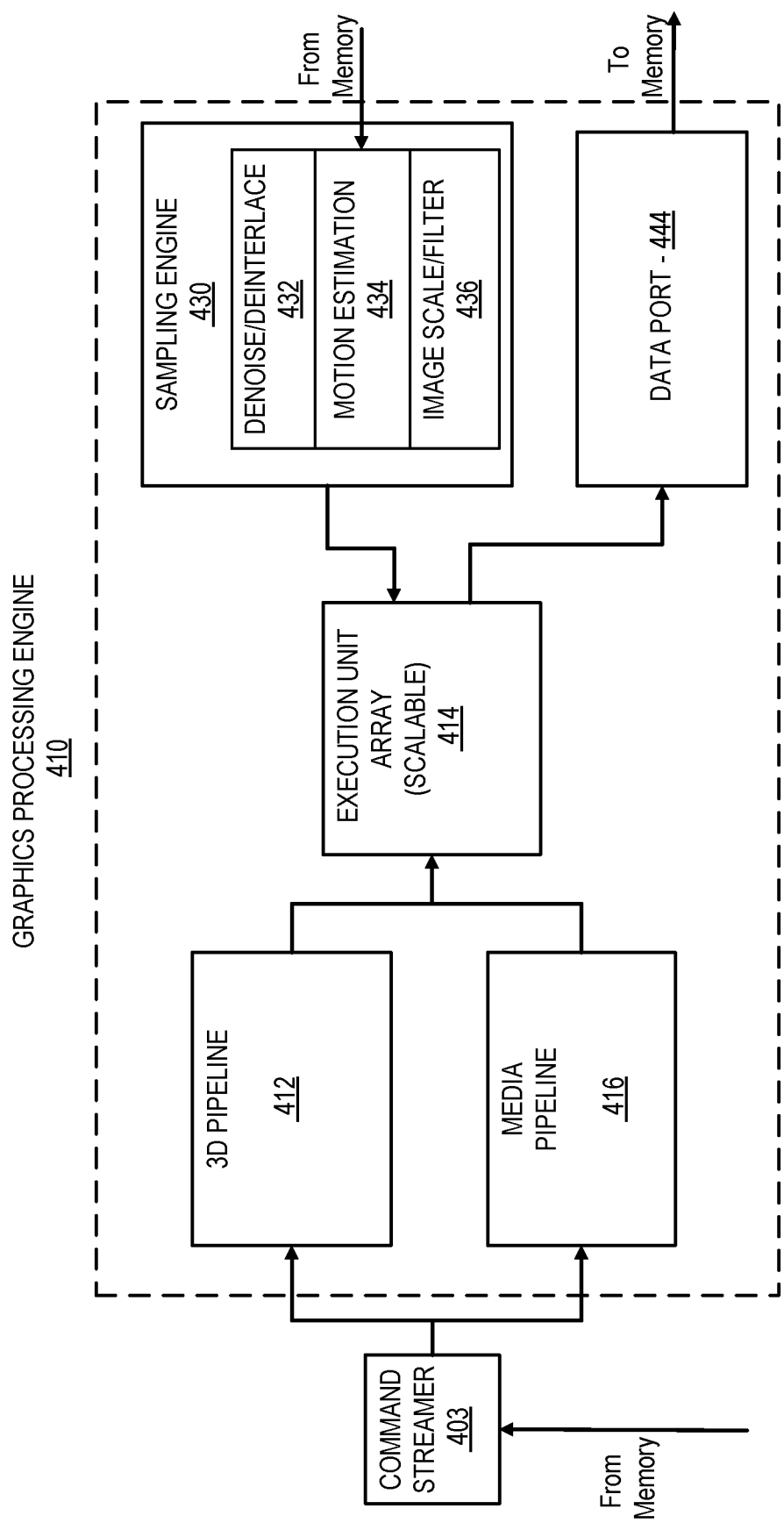
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
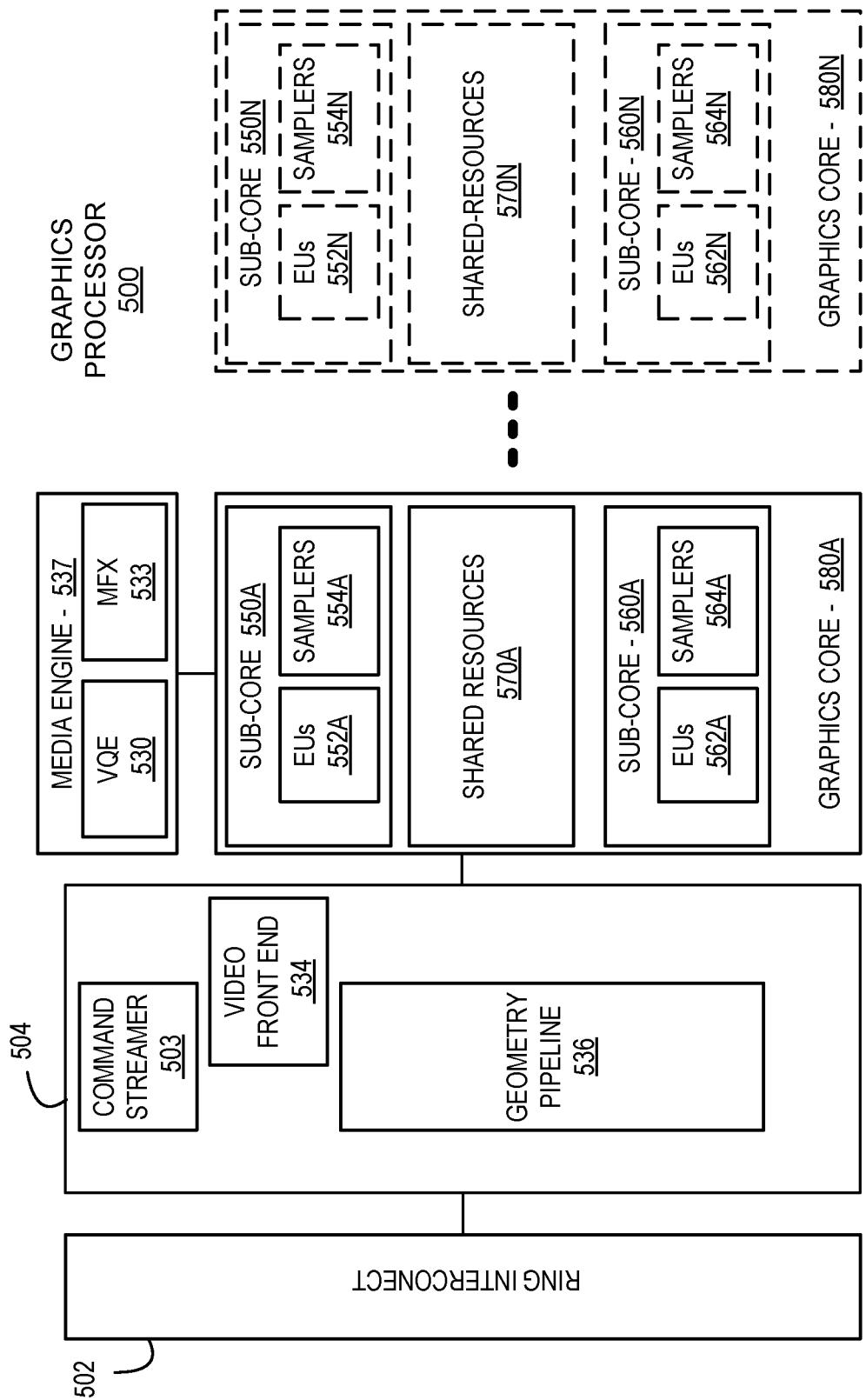
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
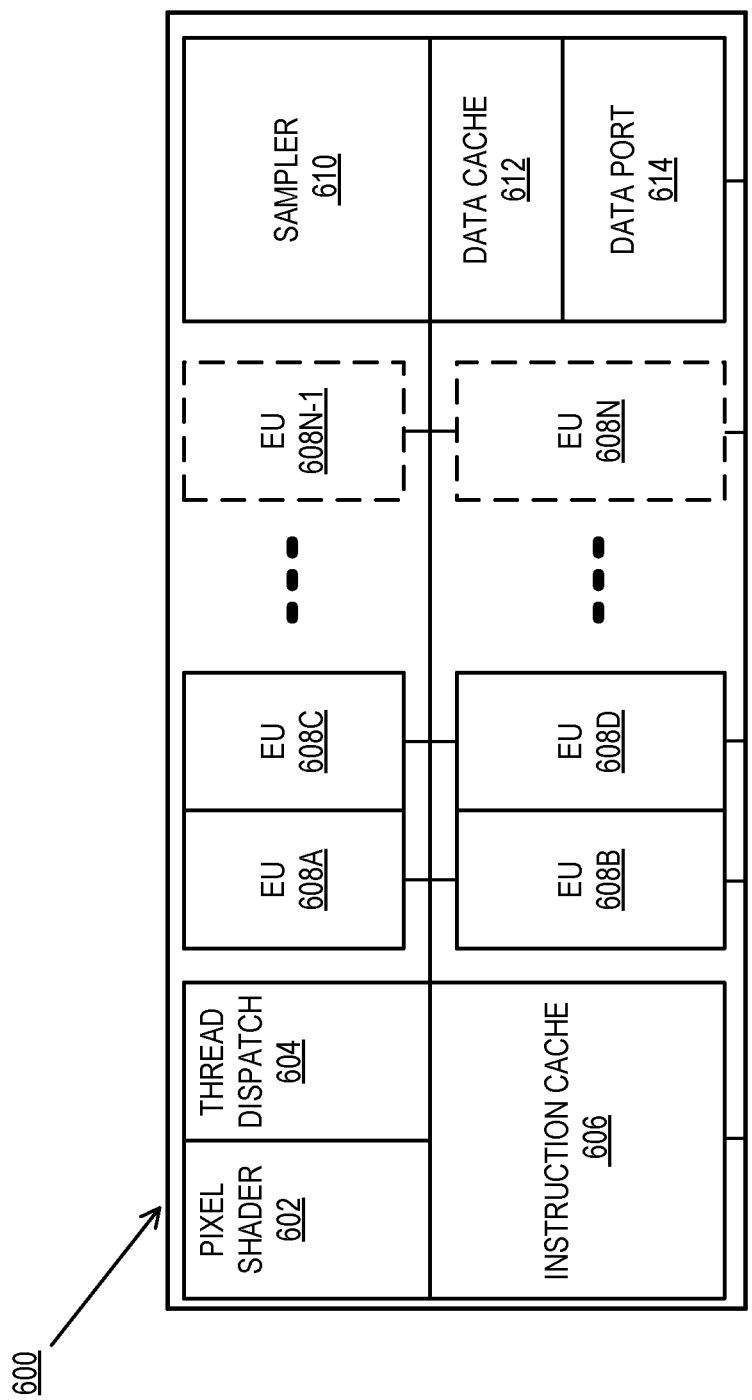
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
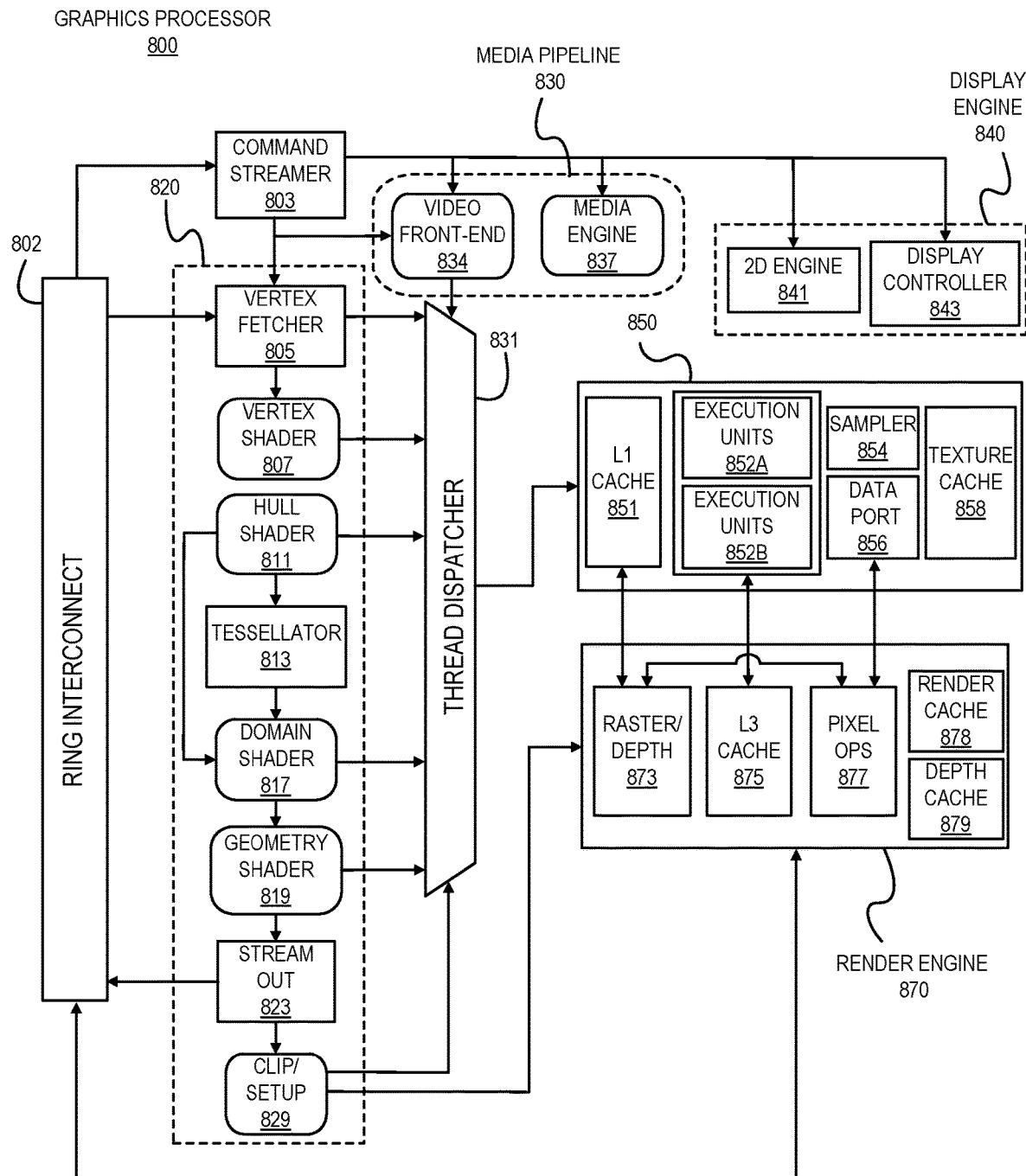
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
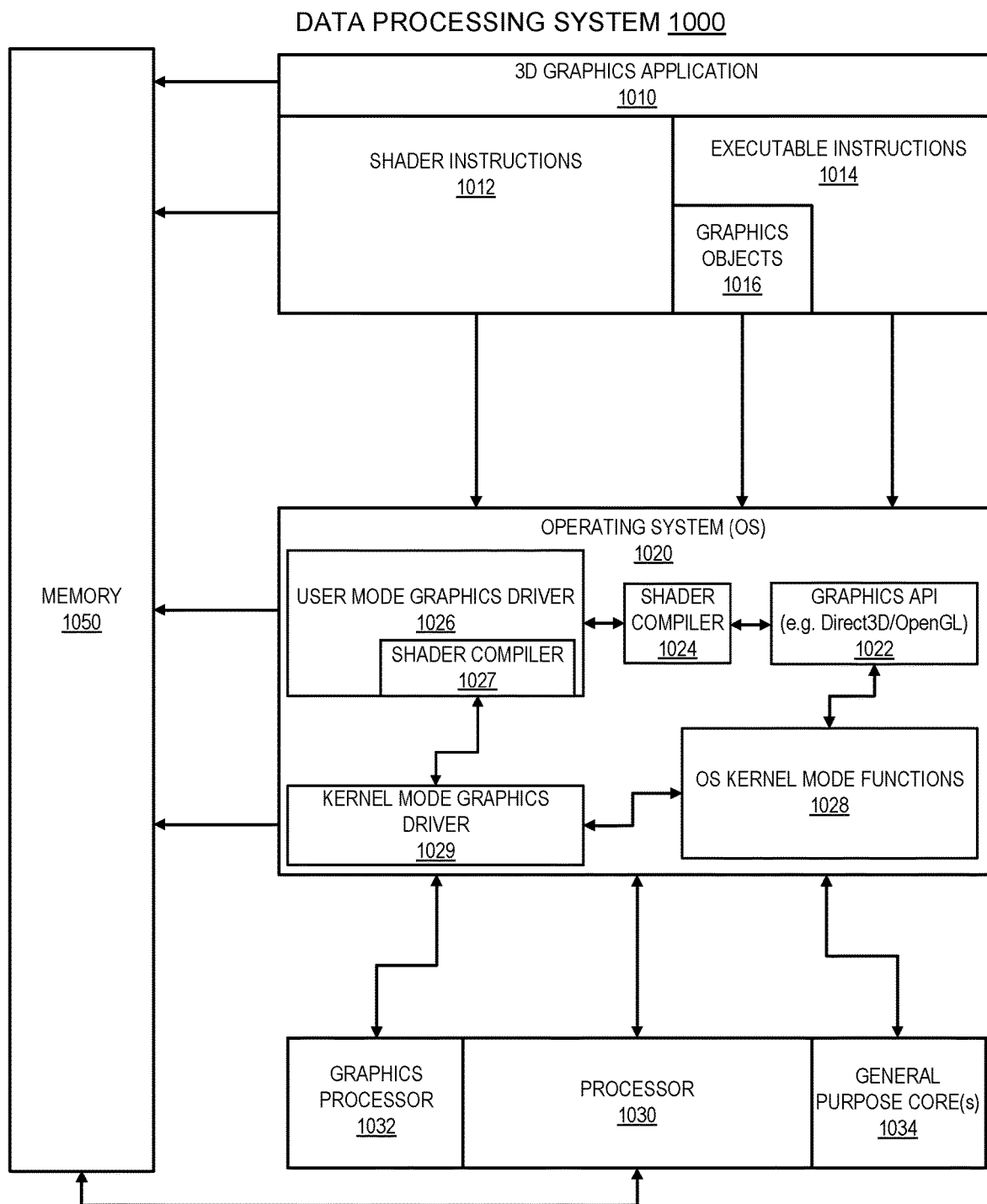
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
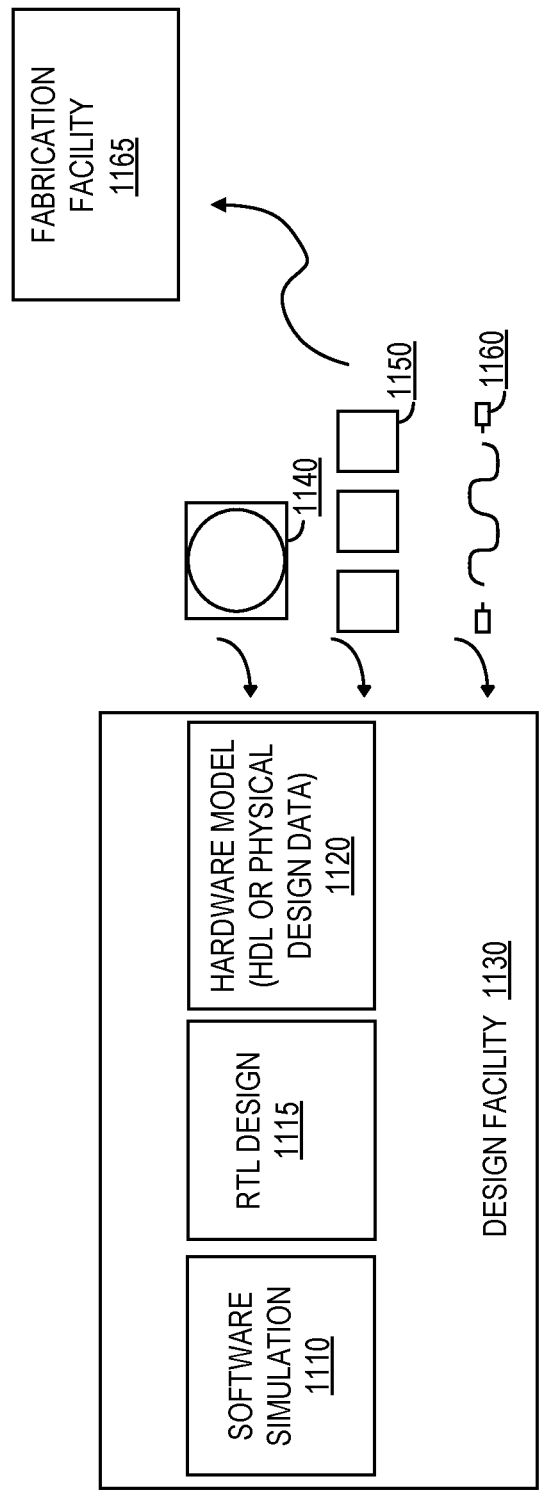
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, reusable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
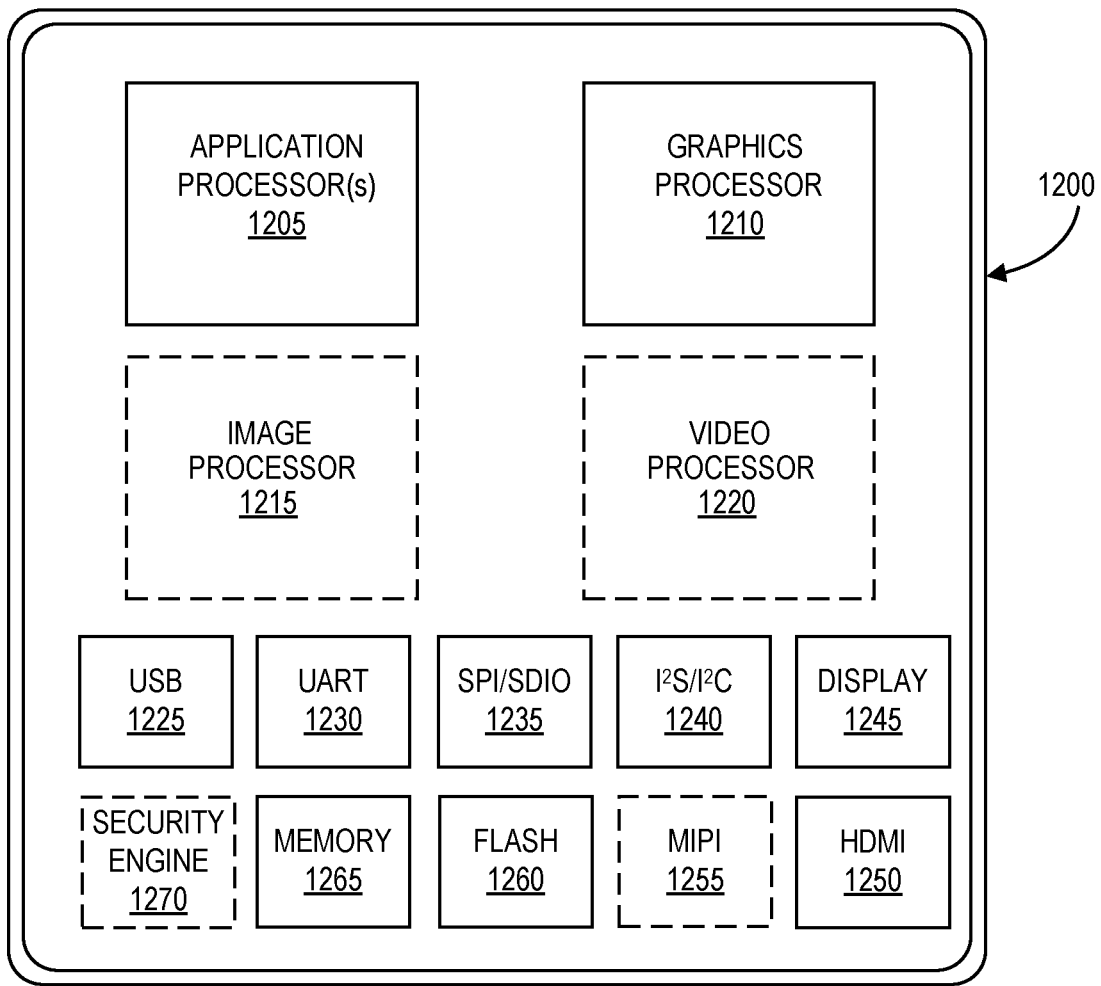
FIG. 12 illustrates an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Apparatus and Method for Pixel Hashing

Traditionally, three dimensional (3D) rendering engines such as graphics processing units (GPUs) process geometry as triangles and divide them into chunks or blocks of pixels that are diverted into compute clusters for rendering. Each pixel in the triangular plane is mutually exclusive from the rest and hence pixel rendering tasks are a primary target for data-level-parallelism as well as thread-level-parallelism. A load-balancing scheduler for pixels in a 3D engine employed in accordance with one embodiment of the invention has the following characteristics:

Adaptable: One embodiment of the invention supports different hashing algorithms for pixel blocks. That is, pixel block task placement to compute clusters is programmable according to the needs of the applications.

Scalable: One embodiment of the invention is also scalable and similar architectures are used to cater to different market segments, from phone/tablet to high end gaming platforms. The scalability within these architectures may be achieved via the number of compute clusters. Consequently, it is incumbent upon the scheduler to support arbitrary numbers of compute clusters.

Flexible: Can support hashing of different pixel blocks and not tied statically to some block size.

One embodiment of the invention includes a table-based pixel hashing scheduler that effectively uses compute-clusters available to the GPU for load balancing. Each entry of the table may be mapped to a programmable register such that different hashing algorithms can be implemented in an adaptable fashion. In one embodiment, the entries of the table are indexed via pixel block address bits and hold a compute cluster ID where the pixel block needs to be executed.

Figure 13:
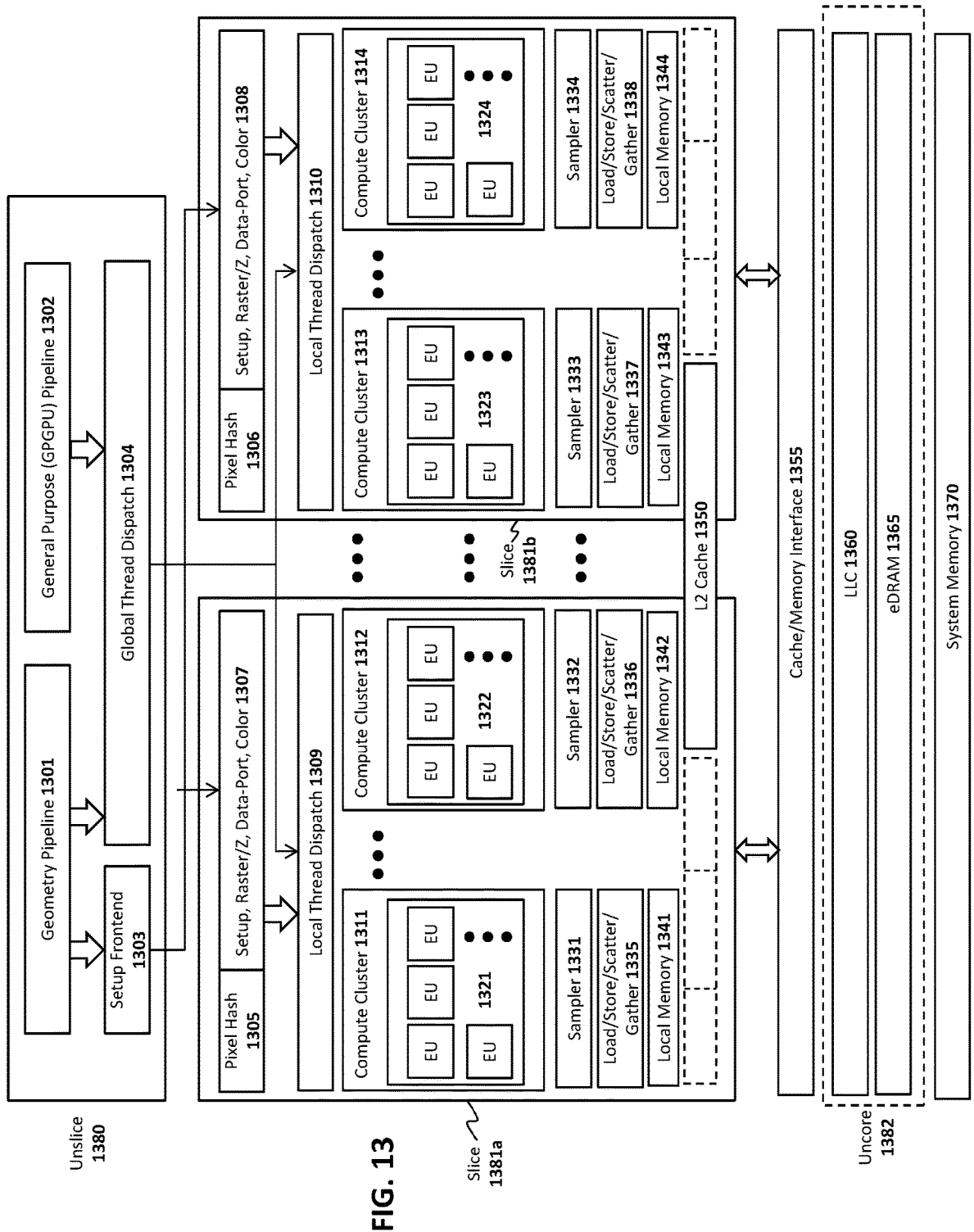
FIG. 13 illustrates one embodiment of an architecture on which embodiments of the invention may be implemented.

FIG. 13 illustrates an architecture in accordance with one embodiment of the invention which includes a unified shader model and consists of three components: Unslice 1380, Slices 1381a-b and Uncore 1382.

For brevity, the focus below is on the rendering pipeline portion of the GPU that renders a 3D image to the screen. Usually, a 3D image starts out as a collection of triangulated surfaces where vertices of the triangles define the shape of the object. In one embodiment, these input lists of vertices are fed to the 3D Geometry pipeline 1301 of the unslice 1380 which transforms the vertices using vertex shaders and creates convex objects like triangles. The vertex shader may be viewed as a program that maps vertices onto the screen and adds special effects to the objects in a 3D environment by performing mathematical operations on attributes of the vertices. Thus, in one embodiment, a global thread dispatch module 1304 dispatches the vertex shaders to the local thread dispatch logic 1309-1310 of the compute clusters 1311-1314. A plurality of execution units (EUs) 1321-1324 within each computer cluster 1311-1314, respectively, execute the vertex shaders to manipulate vertex properties such as position, color and texture coordinates.

The output of this stage is provided to the next pipeline stages, which may include tessellation and a geometry shader (if applicable) within the geometry pipeline 1301. Ultimately, results are sent to the setup frontend unit 1303 where the triangles are created. After creation of the triangles the setup frontend stage may perform other processing such as clipping—i.e., discarding regions that are outside of the view frustum. Moreover, it may also perform simple culling tests to confirm whether the triangles will be the part of the final image or not. The objects that fail these tests are discarded. Finally, the triangles which pass these tests are sent to the raster logic within the raster unit, Z pipe, and color (RZC) clusters 1307-1308 of the slices 1381a-b. Pixel hash logic 1305-1306 at this stage may perform the pixel hashing techniques described below.

Also illustrated in FIG. 13 is an uncore component 1382 which may include a lowest level cache (LLC) 1360 and/or an embedded dynamic random access memory (eDRAM) 1365 accessible by all of the slices 1381a-b when performing graphics operations. A system memory 1370 is also shown which is accessible to both the general purpose processing pipeline and the graphics pipeline.

Slices 1381a-b may be divided into two functional components: the pixel pipe containing the RZC clusters 1307-1308 and the compute clusters 1311-1314 containing the arrays of execution units (EU) 1321-1324, respectively, used for executing programmable shaders. In one embodiment, the pixel pipe begins with a raster unit of the RZC clusters 1307-1308 that determines the location of all the pixels that either lie inside or on the edges of the triangles sent by the geometry pipe 1301. Further, it divides the triangles into symmetrical blocks of pixels that are sent to the Z pipe for depth testing. As the multiple objects in the 3D scene can map to the same position, the Z pipe determines whether the pixels embedded in the block are closest to the observer or are hidden by the previously observed pixels belonging to a different object. The pixels that pass the Z test are shipped to the pixel shader unit that, in turn, executes the pixel shader on a compute cluster 1311-1314 to determine the color and other attributes related to the pixel(s). Finally, the computed values of the pixels are sent to the color pipe of the RZC clusters 1307-1308 that can either optionally blend the computed values with the previously known states or send it to update the render target.

As discussed above, compute clusters 1311-1314 contain an array of multithreaded processing units called as Execution Units (EU) 1321-1324, which act as the primary thread processors. In one embodiment of this architecture, each EU can support 7 thread contexts with different SIMD widths (e.g., 8, 16, 32, etc). Internally, in one embodiment, an EU has two pipes that are quad-pumped—i.e., each pipe has four-stream SIMD processors and can execute both floating point and scalar instructions. Each compute cluster 1311-1314 also has a shared texture-sampling unit 1331-1334 and a load/store unit 1335-1338 that can do gathered reads as well as scattered writes. In addition, in the illustrated embodiment, the shared functions have their own private caches 1341-1344 backed up by a unified L2 cache 1350. To realize the highest efficiency and performance, the work in the form of pixel blocks has to be uniformly distributed across all the compute clusters 1311-1314 as well as the slices 1381a-b. In one embodiment, the pixel-hashing techniques implemented by pixel hashing logic 1305-1306 enable this uniform distribution as discussed in detail below.

In one embodiment, pixel hashing is not only used for load balancing across all the compute clusters 1311-1314 but is also used for maintaining pixel-coherency. As described earlier, multiple triangles in a 3D scene can overlap and it is incumbent upon any hashing mechanism to send the pixel block at a given screen coordinate to the same slice 1381a-b as well as the compute cluster. This is done in order to maintain the Z as well as the color coherency of the pixels. With these two requirements in mind—load-balancing and coherency—the adaptability, scalability, and flexibility of the hashing techniques implemented by one embodiment of the pixel hashing logic 1305-1306 will be addressed as well as the significance of programmable vs. static hashing functions.

Adaptable Pixel Hashing Techniques

The conventional solution to pixel hashing is to design an application-specific integrated circuit (ASIC) with some algorithm in mind that diverts the pixel-blocks into the compute clusters. If the dynamic execution of the shaders corresponding to the pixels in the screen space is similar, then the full efficiency of a parallel system such as a GPU can be achieved. On the other hand, if the pixels using different data sets have vastly different dynamic execution graphs, then there can be a significant decrease in performance due to load imbalance. The weakness of this kind of implementation is that program's dynamic execution profile is unpredictable and designing an optimal hashing algorithm that satisfies all application requirements is impractical.

An adaptable hashing mechanism which can dynamically change according to the needs of an application is employed in one embodiment of the invention. For example, in one embodiment, a preprocessing profile for different 3D games can be conducted to design a near optimal hashing solution that can be fed to the GPU via the GPU driver whenever that particular game is being played. Moreover, in one embodiment, a dynamic feedback mechanism with an inspector-executor model is employed where the driver may read the profiling mechanism and choose an appropriate hashing algorithm to cater to different phases of 3D applications.

Scalable Pixel Hashing Techniques

In addition to adaptability, the scheduling employed via pixel hashing logic 1305-1306 of one embodiment also supports a diverse number of compute clusters 1311-1314. For example, similar architecture generation attempts to satisfy diverse market segments (e.g., from the phone/tablet solutions to high-end gaming platforms). Thus, the same architecture may be used for products that have an arbitrary number of compute clusters 1311-1314 as well as slices 1381*a-b*. Moreover, in some embodiments, the slices may not be symmetric and may have a different number of compute clusters 1311-1314. This, in turn, puts more pressure on the design of hashing mechanism implemented by the pixel hashing logic 1305-1306.

One can design a static ASIC implementation for each end product but this comes with an expense of implementation and validation cycles. Moreover, there may be design-defects or yield-recovery issues due to which some of the EUs 1321-1324 in a slice's compute cluster 1311-1314 turn out to be defective. In this case, a fixed hardware implementation of pixel hashing will not work and will result in load imbalance. To solve all the above-mentioned issues, one embodiment of the pixel hashing logic 1305-1306 includes a programmable hashing mechanism that can not only serve the different market segments but also has the capability to accommodate changes due to hardware defects that usually arise very late in the design cycle.

Flexible Pixel Hashing Techniques

As can be seen from FIG. 13 each slice 1381*a-b* in the baseline architecture is a separate entity and may be responsible for rendering the pixel blocks assigned to a given screen space. Moreover, each slice has its own private local memory 1341-1344 and caches to store the data for rendering pixels. Thus, the less data shared among the slices 1381*a-b*, the more efficiently the system may operate. In general, if the pixel block size is large enough then there will be less communication overhead across the slices 1381*a-b*. However, data locality it is a difficult issue to address as it should be weighed against load balancing. That is, increasing the pixel block size may disturb the schedule and can suffer from compute cluster idle time should the triangles be non-uniformly distributed across the screen space. This property can vary from application to application and/or within phases of the same application.

In one embodiment, the hashing mechanism employed by the pixel hashing logic 1305-1306 identifies this property in a given phase of an application where the objects are uniformly distributed and pixel shaders have similar dynamic execution profiles. For these uniform phases, one embodiment of the hashing mechanism will use a larger pixel block for hashing while for non-uniformed phases it uses smaller pixel blocks to satisfy the load balancing requirements. One particular approach that is simple to implement and is adaptable, scalable and flexible is described in detail below.

Embodiments of the Invention Using Pixel Hashing Techniques

Figure 14:
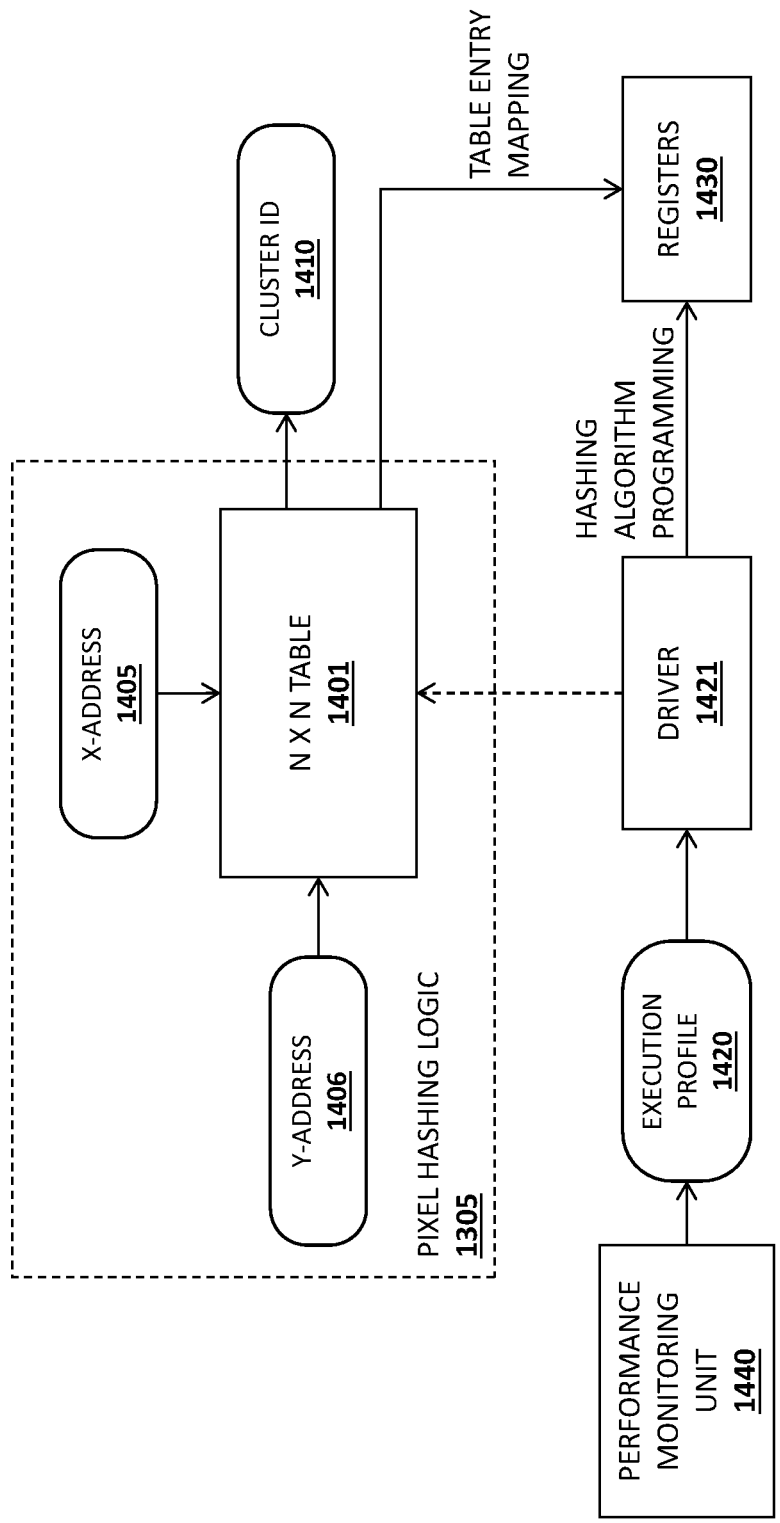
FIG. 14 illustrates one embodiment of the invention in which the pixel hashing logic performs a lookup in a table to identify an execution cluster.

As illustrated in FIG. 14, to realize the above pixel hashing features, the pixel hashing logic 1305 of one embodiment includes an N×N table 1401 for performing pixel hashing operations. In one embodiment, the N×N table 1401 is indexed via the pixel block address which includes an X-address component 1405 and a Y-address component 1406. In one embodiment, the values for the X and Y addresses of each pixel block are derived from the addresses of the pixels allocated to that pixel block. For example, a specified number of the least significant bits of the pixel addresses may be discarded to arrive at the X and Y addresses for the pixel block (e.g., the number of LSBs being based on the size of the pixel block).

In the illustrated embodiment, the X-address component 1405 and Y-address component 1406 are used for hashing the pixel block among different compute clusters by generating a computer cluster ID 1410 uniquely identifying the appropriate compute cluster 1311-1314 to process the pixel block. Thus, each entry of the table 1401 may hold a compute cluster ID 1410 and may also include information identifying a hashing mechanism. For example, as illustrated, each entry of the table 1401 may be mapped to a programmable register 1430 that the graphics driver 1421 may program to adapt for different scenarios (e.g., different hashing algorithms). In one embodiment, the driver 1421 chooses different hashing algorithms based on execution profiling data 1420 collected during the execution of each phase of a graphics application (e.g., a 3D game or other application which uses the graphics engine).

Programmability via the driver 1421 addresses both the adaptability and the scalability issues discussed above. Moreover, in one embodiment, the architecture provides hooks to implement a feedback mechanism, evaluating the execution of each phase of the graphics program code and responsively generating the execution profiling data 1420. The driver 1421 may then read the execution profiling data 1420 for a given phase of an application to evaluate the particular phase and program the table 1401 and/or registers 1430 with an appropriate hashing mechanism. In one embodiment, these hooks are implemented in the form of a performance monitoring unit 1440 that software-based drivers can read for dynamic feedback optimizations. Furthermore, in one embodiment, the driver 1421 can also vary the pixel block size based on the application and/or phase and change the algorithm accordingly. This mechanism can sustain better load balancing to address varying characteristics of different applications.

This embodiment can also be used in a hierarchical arrangement. For example, in the architecture shown in FIG. 14, a first-level table in the hierarchy may provide a slice ID identifying the slice 1381*a-b* on which to execute the pixel block while a second-level table may provide the compute cluster ID identifying the compute cluster 1311-1314 (within the selected slice). One embodiment of a hierarchical arrangement is described below with respect to FIG. 17.

Figure 15:
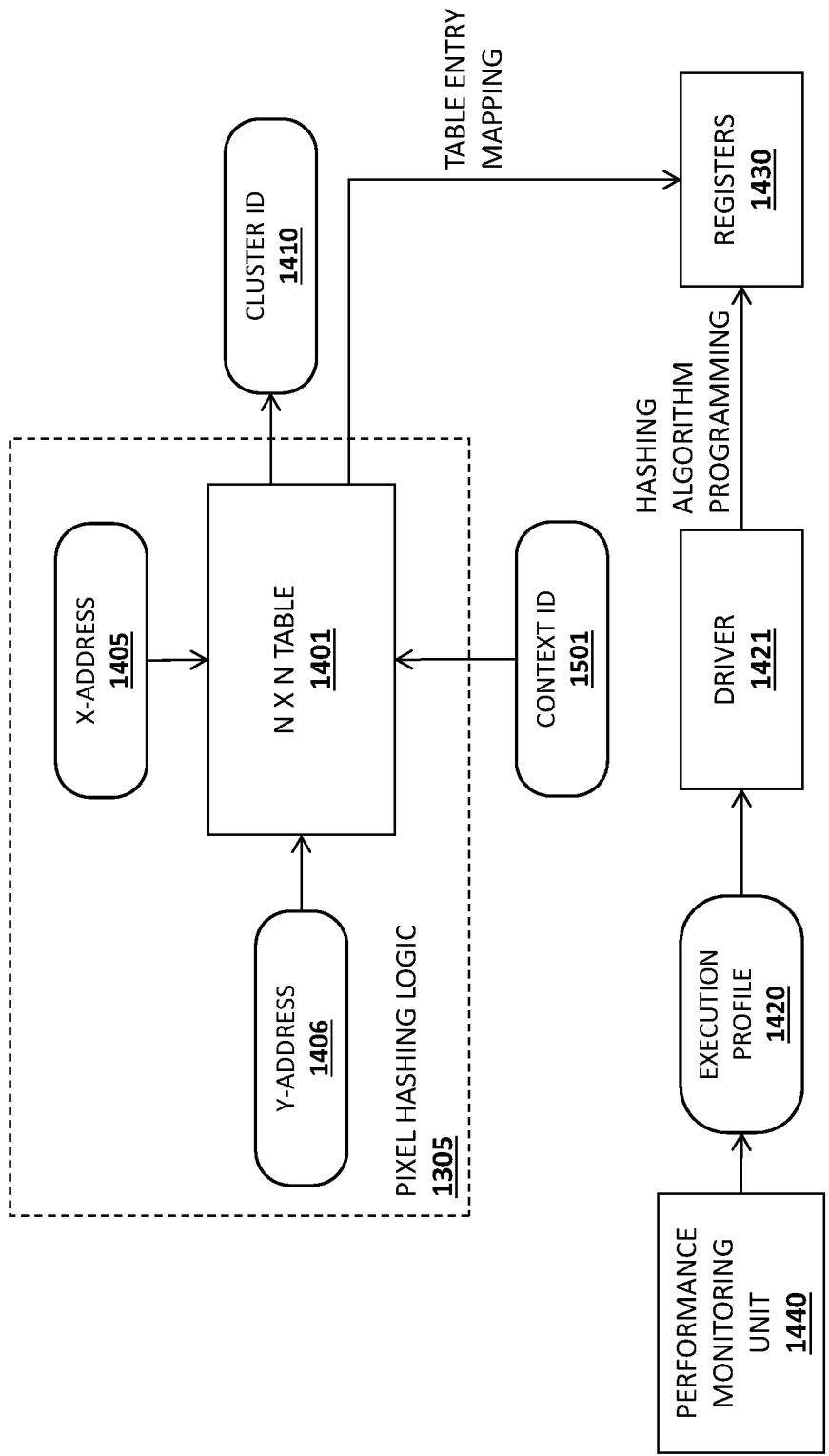
FIG. 15 illustrates another embodiment of the invention in which the pixel hashing logic performs a lookup in a table to identify an execution cluster.

Moreover, in one embodiment, this same mechanism is extended to partition the resources among different software contexts. Contemporary GPUs are capable of executing general purpose applications as well as 3D and media applications. For example, some of the slices 1381*a-b* may be allocated to 3D computations while others may be allocated for general purpose computation as indicated by the general purpose GPU (GPGPU) application/pipeline 1302 in FIG. 13. In one embodiment, illustrated in FIG. 15 different contexts (both 3D and general purpose) may be executed on the same GPU. For this purpose a context-ID 1501 may be used to index the pixel hashing table 1401 in addition to the X and Y addresses 1405-1406 such that the pixel-block from a given context is shipped to the slices 1381a-b and/or compute cluster 1311-1314 assigned for that context.

Figure 16:
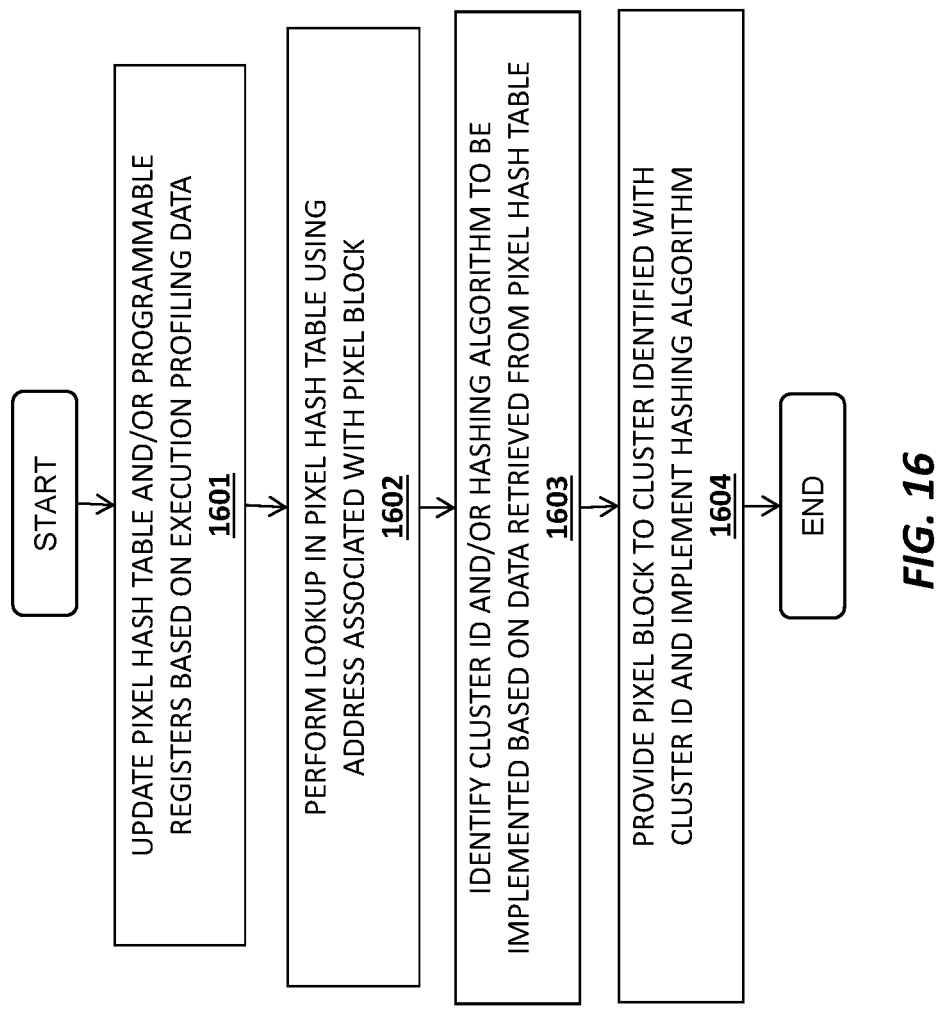
FIG. 16 illustrates a method in accordance with one embodiment of the invention.

FIG. 16 illustrates a method in accordance with one embodiment of the invention. The method may be implemented within the context of the system architectures described above, but is not limited to any particular system architecture.

At 1601, the pixel hash table and/or programmable registers are updated based on execution profiling data. At 1602, a lookup is performed in the pixel hash table using an address associated with a current pixel block (e.g., X and Y values). In addition, as mentioned, a context ID may also be used to index the table. Moreover, the table may be implemented as a multi-level hierarchical table (e.g., identifying a slice at the first level and a compute cluster at the second level).

At 1603 a cluster ID is read from the pixel hash table to identify the execution cluster to execute the pixel block. In addition, the hashing algorithm to be used may also be identified. For example, the pixel hash table entry may point to a programmable register identifying the hashing algorithm. At 1604, the pixel block is provided to the cluster which implements the hashing algorithm.

METHOD AND APPARATUS FOR ADAPTIVE PIXEL HASHING FOR GRAPHICS PROCESSORS

As mentioned above, even though pixel shading distribution is not homogeneous across the frame in many cases, table-based pixel hashing mechanisms use the very same table layouts across the frame which may cause intra-frame load imbalances. To address this limitation, a modified table-based pixel hashing scheduler is described below which effectively uses compute clusters available to the GPU for improved intra-frame load balance. One embodiment of the invention includes a hierarchical design where the screen is divided into fixed-sized areas so that a different table layout may be assigned to each of them. In order to determine the precise table contents, several heuristics, such as the pixel shading distribution, may be used. Such heuristics can be collected in a Position Only Shading pipeline where the visibility of triangles are recorded.

Figure 17:
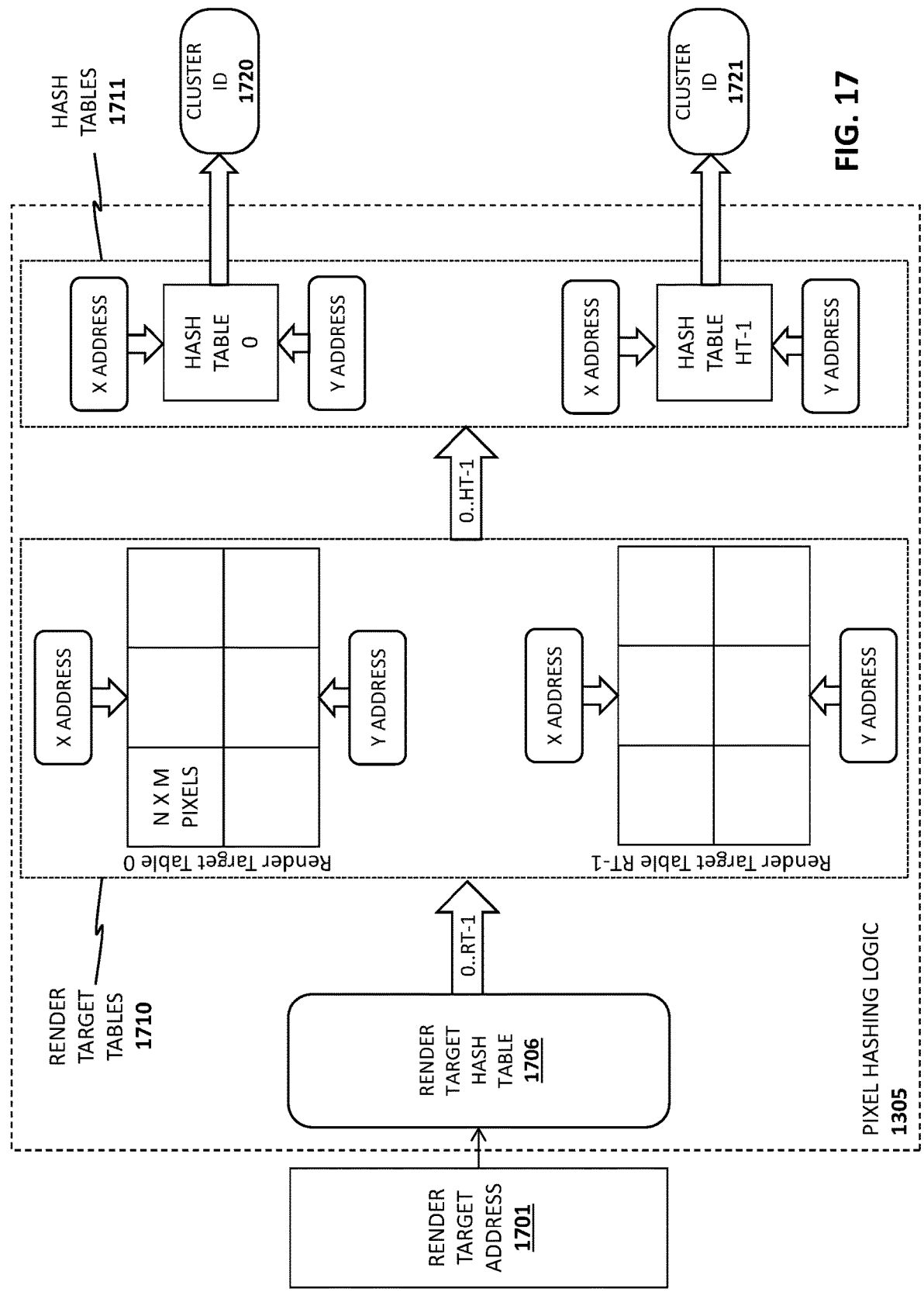
FIG. 17 illustrates one embodiment of the invention for performing adaptive pixel hashing.

One embodiment of a baseline architecture which includes a table-based pixel shading mechanism was described above with respect to FIGS. 13-16. FIG. 17 illustrates an extension to this architecture to deal with intra-frame load imbalance in accordance with one embodiment of the invention. In particular, the pixel hashing logic 1305 includes a render target hash table 1706 which, given a particular render target address 1701, generates a render target ID in [0 . . . RT-1] to identify one of a set of render target tables 1710 to be used in the next step. The render target table 1710 identified by the render target ID is then addressed using the X and Y addresses of the pixel block. In the illustrated embodiment, each render target table 1710 assumes that the screen is divided into N×M pixel blocks. In this way, a different Hash Table ID is assigned to each of them. That is, a different hash table can be used for different areas of each render target including the color buffer. The output of the render target tables 1710 comprises a hash table ID identifying one of a plurality of hash tables 1711. Finally, using the X address and Y address of the pixel block, the baseline table-based pixel hashing mechanism (e.g., described above with respect to FIGS. 14-15) is applied using the selected hash table, resulting in a cluster ID 1720-1721 identifying an execution cluster.

Using these embodiments of the invention, the number of required render targets is small for many games and other graphics applications. Consequently, the render target hash table 1711 just needs a few entries with $\log_2 RT$ bits each. Moreover, the size of render target tables 1710 depends on the granularity of the pixel blocks (i.e., N and M), and the number of hash tables 1711 since each entry would require $\log_2 HT$ bits.

For example, for a 4K resolution (4096×2160), four render targets, 256×256 pixel blocks and four hash tables, the render target hash table 1706 would require four 2-bit entries, and each render target table 1710 would have 144 2-bit entries. In order to populate the render target tables 1710, different heuristics, such as the pixel shading distribution, may be used. To do so, in one embodiment, the render target tables 1710 are updated at the end of frame N before frame N+1 starts.

In one embodiment, these render target tables 1710 can be populated adaptively by collecting heuristics such as triangle distribution and pixel shading distribution in the positions where the visibility information of the triangles are recorded and hash tables 1711 may be populated in the same frame.

Figure 18:
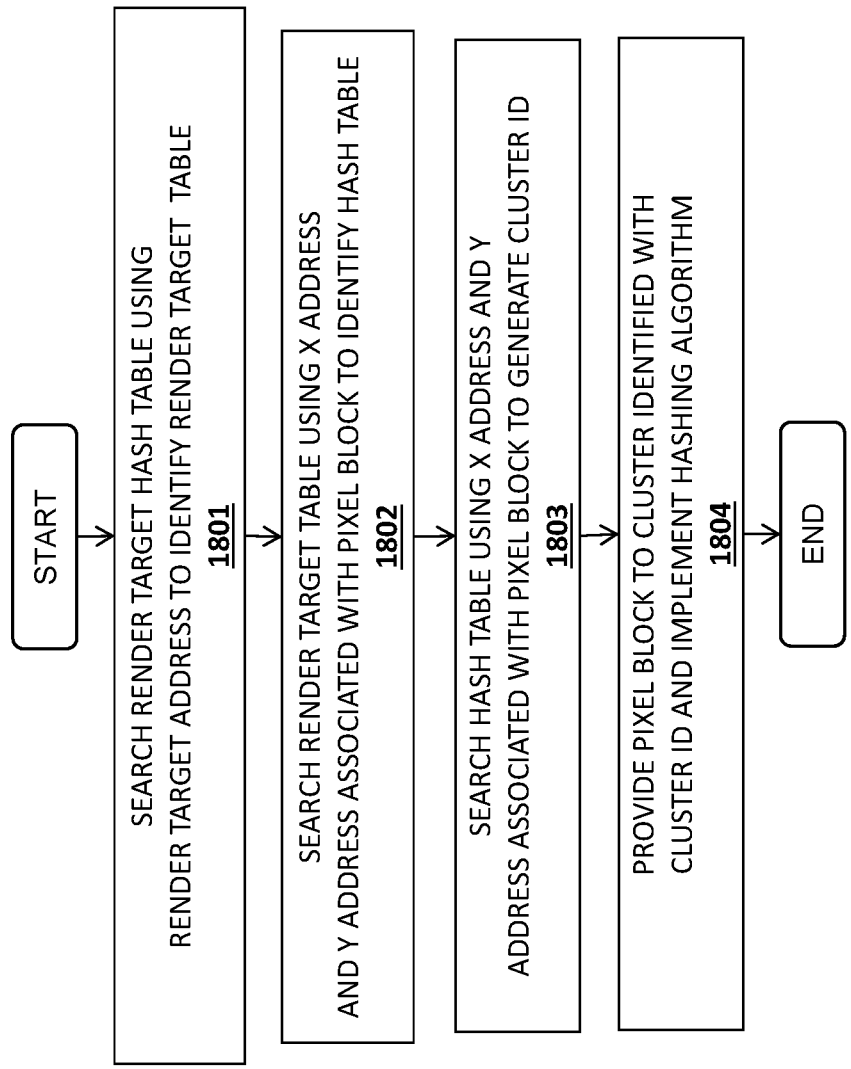
FIG. 18 illustrates a method in accordance with one embodiment of the invention.

A method in accordance with one embodiment of the invention is illustrated in FIG. 18. The method may be implemented within the context of the system architectures described above, but is not limited to any specific system architecture.

At 1801, a render target hash table is searched using a render target address to identify a render target table. At 1802, the render target table identified in 1801 is searched using the X and Y addresses associated with the pixel block to identify a hash table. At 1803, the hash table identified in 1802 is searched using the X and U addresses associated with the pixel block to generate a cluster ID. Finally, at 1804, the pixel block is provided to the cluster identified with the cluster ID which implements the hashing algorithm.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
performing a first lookup in a first data structure to identify a second data structure;
performing a second lookup in the second data structure using coordinates for a pixel block to identify a third data structure;
performing a third lookup in the third data structure indexed based on the coordinates of the pixel block, the third lookup identifying an entry in the third data structure corresponding to the coordinates of the pixel block; and
processing the pixel block by an execution cluster based on the entry.

2. The method as in claim 1 wherein the first data structure comprises a render target hash table and wherein the first lookup is performed using a render target address.

3. The method as in claim 2 wherein the second data structure comprises a render target table.

4. The method as in claim 3 wherein the entry further identifies a hashing mechanism to be implemented to process the pixel block.

5. The method as in claim 4 wherein the entry identifies a programmable register containing information identifying the hashing mechanism to be implemented.

6. The method as in claim 1 wherein the information identifying an execution cluster comprises a cluster ID.

7. The method as in claim 1 wherein the information identifies both an execution slice and an execution cluster within the execution slice to process the pixel block.

8. The method as in claim 1 wherein a context ID is used in addition to the X and Y coordinates of the pixel block to identify an application context associated with the pixel block.

9. The method as in claim 1 further comprising:
performing execution profiling on an execution phase of an application executed by a graphics processing unit that includes the execution cluster to generate execution profiling data; and
using the execution profiling data to adaptively populate the first data structure and/or the second data structure to process the pixel block.

10. The method as in claim 9 further comprising:
using the execution profiling data to determine a hashing mechanism to be implemented to process the pixel block.

11. The method as in claim 10 further comprising:
storing the information identifying the hashing mechanism in a programmable register, wherein the entry in the third data structure points to the programmable register and wherein reading information from the entry includes identifying the programmable register to determine the hashing mechanism.

12. The method as in claim 11 wherein the hashing mechanism specifies a larger pixel block for a uniform phase of the application and specifies a smaller pixel block size for a non-uniform phase of the application to satisfy load balancing requirements.

13. A processor comprising:
a plurality of execution clusters to perform parallel execution of program code;
pixel hashing logic to perform a first lookup in a first data structure to identify a second data structure, to perform a second lookup in the second data structure using coordinates for a pixel block to identify a third data structure, and to perform a third lookup in the third data structure indexed based on the coordinates of the pixel block, the third lookup identifying an entry in the third data structure corresponding to the coordinates of the pixel block, and to read information from the entry identifying a first execution cluster to process the pixel block; and
the first execution cluster to responsively process the pixel block.

14. The processor as in claim 13 wherein the first data structure comprises a render target hash table and wherein the first lookup is performed using a render target address.

15. The processor as in claim 14 wherein the second data structure comprises a render target table.

16. The processor as in claim 15 wherein the entry further identifies a hashing mechanism to be implemented to process the pixel block.

17. The processor as in claim 16 wherein the entry identifies a programmable register containing information identifying the hashing mechanism to be implemented.

18. The processor as in claim 13 wherein the information identifying an execution cluster comprises a cluster ID.

19. The processor as in claim 13 wherein the information identifies both an execution slice and an execution cluster within the execution slice to process the pixel block.

20. A system comprising:
a network interface for receiving program code for an application over a data network;
a memory for storing the program code;
an I/O interface for receiving user input;
a plurality of execution clusters to perform parallel execution of program code;
pixel hashing logic to perform a first lookup in a first data structure to identify a second data structure, to perform a second lookup in the second data structure using coordinates for a pixel block to identify a third data structure, and to perform a third lookup in the third data structure indexed based on the coordinates of the pixel block, the third lookup identifying an entry in the third data structure corresponding to the coordinates of the pixel block, and to read information from the entry identifying a first execution cluster to process the pixel block; and the first execution cluster to responsively process the pixel block.

* * * * *